Aug. 19, 1924.

E. W. DERR

TOOL HANDLE

Filed Sept. 26, 1923

1,505,379

Inventor:
Earle W. Derr,
by Attys.

Patented Aug. 19, 1924.

1,505,379

UNITED STATES PATENT OFFICE.

EARLE W. DERR, OF AKRON, OHIO, ASSIGNOR TO THE MILLER RUBBER COMPANY, OF AKRON, OHIO, A CORPORATION OF OHIO.

TOOL HANDLE.

Application filed September 26, 1923. Serial No. 664,910.

*To all whom it may concern:*

Be it known that I, EARLE W. DERR, a citizen of the United States, and resident of Akron, in the county of Summit and State of Ohio, have invented certain new and useful Improvements in Tool Handles, of which the following is a specification.

My present invention relates to improvements in tool handles, and while shown herein as embodied in a saw handle, is adapted for uses in connection with various types of tools, as will be apparent.

Heretofore such handles have usually been made of wood, which to give the requisite strength, must be made of hard close grained wood, which involves material expense due to the cost of stock of this character and the cost of shaping and finishing the same.

The present invention aims to produce a handle which will be stronger and more durable than the ordinary wood handle, and which may be much more economically produced, and the invention comprises the novel article and the method of making the same hereinafter described, the nature and scope of the invention being particularly defined by the claim appended hereto.

In order that my invention may be better understood, I have appended hereto illustrative drawings in which:—

Figure 1:
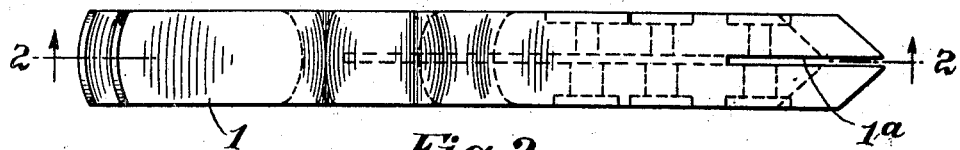
Figure 1 is an edge view of a saw handle.
Figure 2:
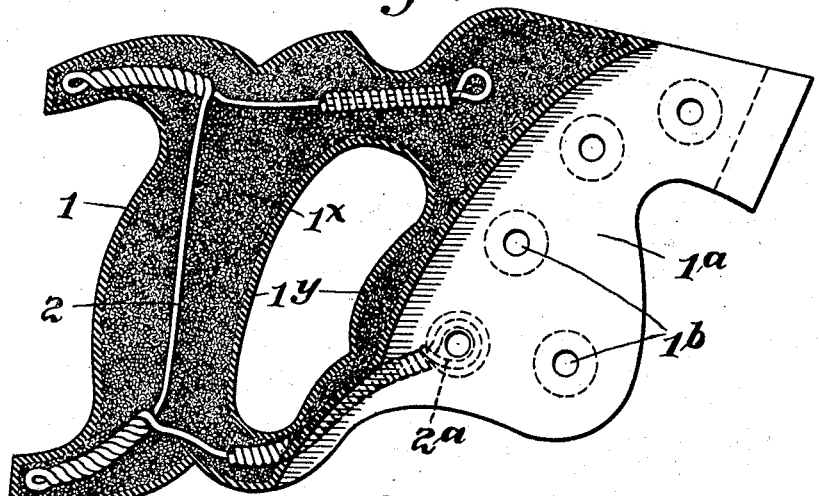
Fig. 2 is a section on line 2—2 of Fig. 1.
Figure 3:
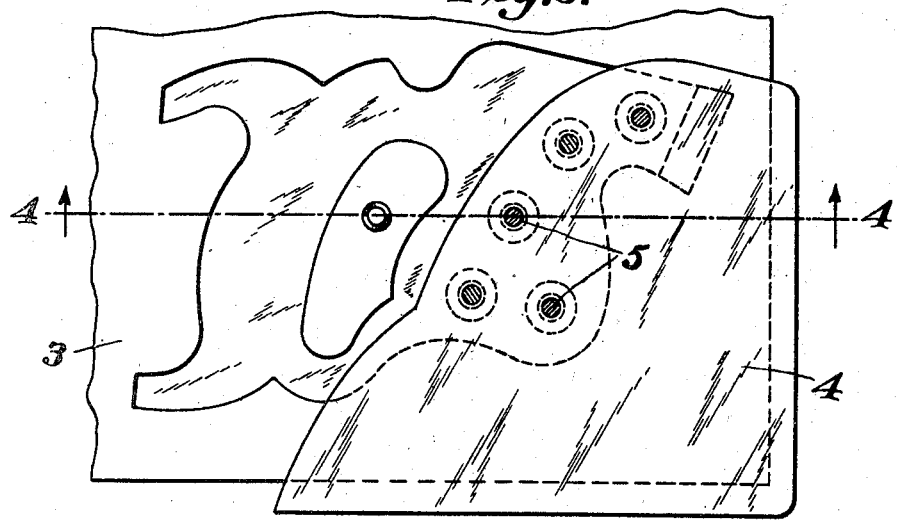
Fig. 3 is a partial plan of a mold used for producing the illustrated handle.

Referring by reference characters to this drawing, the numeral 1 designates the handle, which is of the usual or any desired form, provided with a saw blade receiving slot $1^a$ having the customary rivet holes $1^b$. My improved saw handle comprises an inner body portion designated $1^x$, which is composed of hard rubber compound of a cellular nature, to wit, hard rubber compound in which has been incorporated a suitable blowing agent before vulcanization which is gasified by the vulcanizing temperature, and as the blowing agent is uniformly distributed through the compound in a fine state of subdivision, the body portion is provided with a plurality of evenly distributed minute cells. This interior, or body portion, is surfaced by non-blower containing hard rubber compound, as indicated at $1^y$, the walls of the slot or kerf $1^a$ being formed of similar non-blower containing compound.

Figure 4:
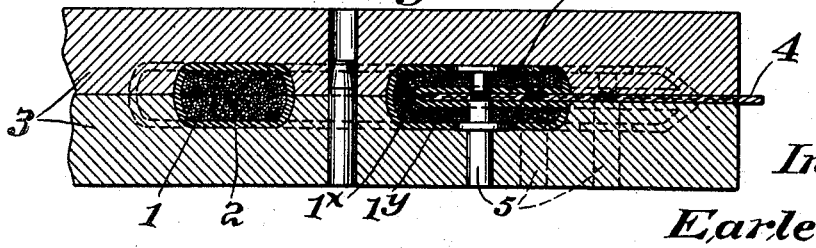
Fig. 4 is a section of the mold on the line 4—4 of Fig. 3 with the cores in place.

The handle is, or may be, reinforced by a wire frame 2, one or both ends of which may be extended as desired, and provided with a rivet receiving eye or eyes, as indicated at $2^a$. In the manufacture of my improved handle I use a metal mold 3 which is parted in the center. A metal core 4 of the requisite shape and thickness is provided for producing the tool socket or slot $1^a$, this being sunk equally into each mold plate and being adapted to be clamped thereby in position. The core is provided on each side with a facing layer of hard rubber producing compound not having any blower agent incorporated therein, as indicated at $1^y$ in Fig. 4, and the walls of the mold cavity are likewise provided with layers of non-blower containing hard rubber compound, the intervening space being filled with hard rubber producing compound containing blower material, as indicated at $1^x$. The mold being closed and subjected to the vulcanizing heat for the necessary period, the heat first expands the blower material, which causes the compound to expand and accurately fill the mold and conform perfectly to the walls thereof, the several layers being finally vulcanized into a single homogeneous article. Obviously the mold may be engraved to provide any suitable ornamentation in the handle.

By this method I produce a handle which is light, strong and durable, and which will have a finished appearance after it issues from the mold, whereby the necessity of any polishing, varnishing, or the like is done away with. I also produce a handle which is not likely to split on the line of the tool socket, which is a serious objection to tool handles of wood, as customarily made.

Another important advantage of my improved handle is that it can be made of any desired or predetermined weight. In designing many tools it is necessary to so proportion the weight of the various parts that the tool will have correct balance. By the process used by me the material may be weighed before placing in the mold, and as the blower causes the article to expand to the proper shape and size the weight may be controlled regardless of the size. This gives me a great advantage over wood which does not run uniform in weight.

Where the tool socket engaging portion is tapering, as for instance a saw blade having a thin back, the slot may be easily made with a corresponding taper by a properly shaped core piece. The rivet receiving eyes 1ᵇ may be formed by the insertion of suitable cores, as indicated at 5.

Having thus described my invention, what I claim is:—

A scroll handle for a hand saw formed of hard sponge rubber with a hard rubber surface and reinforced by a wire following the general contour of the handle, and providing a stiffening means for the blade receiving part of such handle.

In testimony whereof, I affix my signature.

EARLE W. DERR.